B. LATHAM & J. T. WAY.
Apparatus for Regulating the Temperature of Water and other Liquids.
No. 231,058.　　　　　　　　　　Patented Aug. 10, 1880.
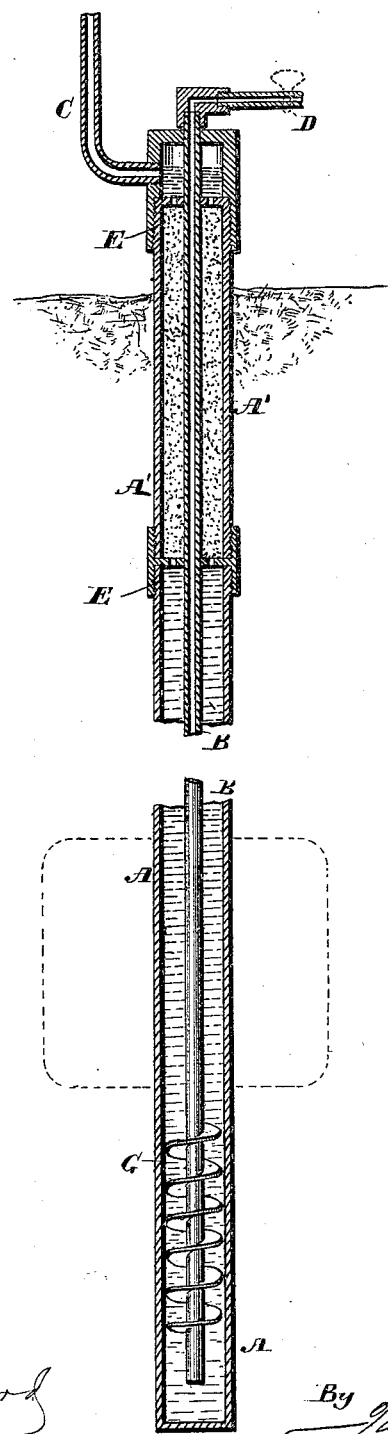
Attest:
J. Henry Kaiser
J. A. Rutherford
Inventors
Baldwin Latham
and
John Thos. Way
By James L. Norris
Atty.

UNITED STATES PATENT OFFICE.

BALDWIN LATHAM AND JOHN T. WAY, OF KENSINGTON, ENGLAND.

APPARATUS FOR REGULATING THE TEMPERATURE OF WATER AND OTHER LIQUIDS.

SPECIFICATION forming part of Letters Patent No. 231,058, dated August 10, 1880.

Application filed February 11, 1880. Patented in England July 18, 1879.

*To all whom it may concern:*

Be it known that we, BALDWIN LATHAM and JOHN THOMAS WAY, citizens of England, residing, respectively, at No. 7 Westminster Chambers and at No. 9 Russell Road, Kensington, both in the county of Middlesex, England, have invented certain new and useful Improved Means and Apparatus for Regulating the Temperature of Water or other Liquid, for which we have received Letters Patent in England, No. 2,928, dated July 18, 1879; and we do hereby declare that the following is a full, clear, and exact description of the invention, which will enable others skilled in the art to which it appertains to make and use the same.

Our invention relates to that class of devices in which a supply-pipe conveys water into a pipe or vessel driven or sunk into the earth, and a delivery-pipe extended nearly to the bottom of said sunken pipe or vessel, so that when the water has become cooled it may be withdrawn through the delivery-pipe.

Our improvement consists in a downflow-pipe adapted to be sunk or driven into the earth and having a filter arranged in its upper portion, and also being provided with one or more transverse perforated diaphragms, in combination with a spiral blade arranged in the lower portion of said pipe and a delivery-pipe leading from near the bottom to the top of the said downflow-pipe, the said blade being arranged upon the lower portion of the delivery-pipe; also, in the combination of the downflow-pipe having an inlet at its upper end with an ascending pipe extending nearly to the bottom of the downflow-pipe and having a blade arranged spirally upon its lower portion, all as hereinafter fully set forth.

The drawing shows a vertical section of an apparatus constructed according to our invention for tempering water.

It consists of the pipe A, driven or otherwise sunk into the ground, and having within it a smaller pipe, B. Water supplied by a pipe, C, descends the pipe A and ascends from its lower part by B to the discharge, which may have a stop-cock, D, or other valve. One or more perforated diaphragms, E, are introduced at various heights in the pipe A to cause uniform distribution of the water and prevent internal circulation.

The descending pipe A may at any part of its depth be expanded into a cistern, as indicated by the dotted lines, in which case it will be necessary to dig the ground to the depth of the cistern.

The lower part of the pipe A is occupied by a blade or worm, G, coiled round the ascending pipe B, so as to cause the water to circulate round the deeply-buried part, exposing it for an extended time to the tempering action of the surrounding earth. Also, the upper part of the pipe A' constitutes a filter for purifying the water supplied, the filtering substance being placed between the two perforated diaphragms E E.

When the pipe A is to be driven into the ground its lower extremity will be made conical shaped; or, if desired, it may be made in the form of an auger.

If it is desired, the water may be caused to descend repeatedly by arranging a number of pipes, A, in succession, so that the water from the delivery-pipe of one of said pipes will be discharged into the next pipe in the series.

The depth to which the tempering pipe or cistern should be sunk varies in different localities; but practically we find that in temperate climates a depth of twenty-five to thirty-five feet is sufficient for obtaining a near approach to uniformity of temperature throughout the year. Where less uniformity is required a less depth will obviously suffice.

Having thus described the nature of the said invention and in what manner the same is to be performed, we claim—

1. The downflow-pipe A, having the filter arranged in its upper portion, and provided with one or more transverse perforated diaphragms, in combination with a spiral blade, G, arranged at the lower portion of said pipe, and the ascending pipe B, leading from near the bottom to the top of said downflow-pipe, substantially as described.

2. The downflow-pipe A, provided with an inlet-pipe, C, in combination with the ascending pipe B, extending nearly to the bottom of the pipe A, and having the spiral blade G arranged upon its lower portion, substantially as set forth.

In testimony whereof we have signed our names to this specification, in the presence of two subscribing witnesses, this 19th day of January, 1880.

BALDWIN LATHAM.
JOHN THOMAS WAY.

Witnesses:
CHAS. D. ABEL,
JNO. P. M. MILLARD.